United States Patent
Blattert

(10) Patent No.: US 6,237,729 B1
(45) Date of Patent: May 29, 2001

(54) METHOD AND APPARATUS FOR CONTROLLING A VEHICLE BRAKING SYSTEM

(75) Inventor: Dieter Blattert, Kirchheim/neckar (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/330,767

(22) Filed: Jun. 11, 1999

(30) Foreign Application Priority Data

Jun. 12, 1998 (DE) .............................................. 198 26 052

(51) Int. Cl.$^7$ ................................ B60B 33/00; B60L 7/00
(52) U.S. Cl. .............. 188/158; 188/1.11 E; 188/1.11 L; 303/20
(58) Field of Search ................... 303/20, 115.1, 303/115.2, 115.4, 116.1, 116.2, 155; 188/158, 1.11 E, 1.11 L

(56) References Cited

U.S. PATENT DOCUMENTS

| | | | |
|---|---|---|---|
| 5,125,483 | * 6/1992 | Kitagawa et al. | ................... 188/158 |
| 5,366,280 | * 11/1994 | Littlejohn | .................................. 303/3 |
| 5,722,744 | * 3/1998 | Kupfer et al. | ........................ 303/189 |
| 5,829,845 | * 11/1998 | Maron et al. | ........................... 303/20 |
| 5,848,672 | * 12/1998 | Brearley et al. | ................. 188/1.11 L |
| 5,954,407 | * 9/1999 | Schramm et al. | .................... 303/155 |
| 5,984,433 | * 11/1999 | Stumpe et al. | ........................ 303/155 |
| 6,000,507 | 12/1999 | Böhm et al. | . |
| 6,008,604 | * 12/1999 | Maisch | ............................... 188/72.1 |
| 6,040,665 | * 3/2000 | Shirai et al. | .......................... 188/158 |

FOREIGN PATENT DOCUMENTS

WO 94/24453    10/1994   (WO) .

* cited by examiner

Primary Examiner—Christopher P. Schwartz
(74) Attorney, Agent, or Firm—Kenyon & Kenyon

(57) ABSTRACT

A method and apparatus for controlling a vehicle braking system, in which an air gap is set after completion of a braking operation. The size of the air gap depends on the operating state of the vehicle.

12 Claims, 4 Drawing Sheets

METHOD AND APPARATUS FOR CONTROLLING A VEHICLE BRAKING SYSTEM

FIELD OF THE INVENTION

The present invention relates to a method and an apparatus for controlling a vehicle braking system.

BACKGROUND INFORMATION

It is desirable to adjust the air gap on a wheel brake in view of the brake lining wear that is always present, and changes in boundary conditions, for example the brake temperature. This applies in particular to an electrically motor-driven wheel brake system on motor vehicles, in which the wheel brakes are actuated by activating electric-motor brake positioners. In these braking systems the air gap must be adjusted actively, i.e., by activating the brake positioner. Electrically motor-driven wheel brakes for motor vehicles are known, for example from PCT Publication No. 94/24453, where the application force is generated by an electric motor. In an electrically controlled braking system, a requisite air gap (spacing between the brake lining and brake disk or drum) should be maintained in the unbraked state at all operating points.

Important factors regarding the air gap are on the one hand that a small air gap is desirable in order to minimize the time necessary for application of the brake linings, while on the other hand a larger air gap is necessary so that in the unbraked state, frictional losses do not occur between the brake disk and brake lining in any operating situation, even, for example, in the event of impact on the brake disk or, because of the elasticity of the suspension system (steering knuckles, etc.) on poor road surfaces.

SUMMARY OF THE INVENTION

It is an object of the present invention to meet the various needs in terms of air gap adjustment set forth above.

The approach described below takes into account the various demands on the air gap adjustment system, especially in terms of absence of friction when the vehicle is not being braked, and the dynamics of a braking action.

It is particularly advantageous that the air gap is actively increased when predefined conditions exist. These conditions indicate that the probability of an immediately imminent braking operation is no greater than an average probability. In an operating state in which it must be assumed, with high probability, that a braking operation is immediately imminent, a smaller air gap is set.

An application in systems in which the air gap can be actively adjusted, for example in electric-motor braking systems, is particularly advantageous.

Advantageously, the service life of the brake disk and the brake lining, or of the brake drum and brake shoe, are extended.

In addition, the reduction in the residual torque on the vehicle wheel yields a reduction in the vehicle's fuel consumption.

It is furthermore particularly advantageous that the expanded air gap is dynamically decreased very quickly in the event of a braking requirement, by the fact that the wheel brake adjusting device is displaced with almost maximum dynamics, the control method advantageously differing from the control method in the case of a braking operation.

DETAILED DESCRIPTION

Figure 1:
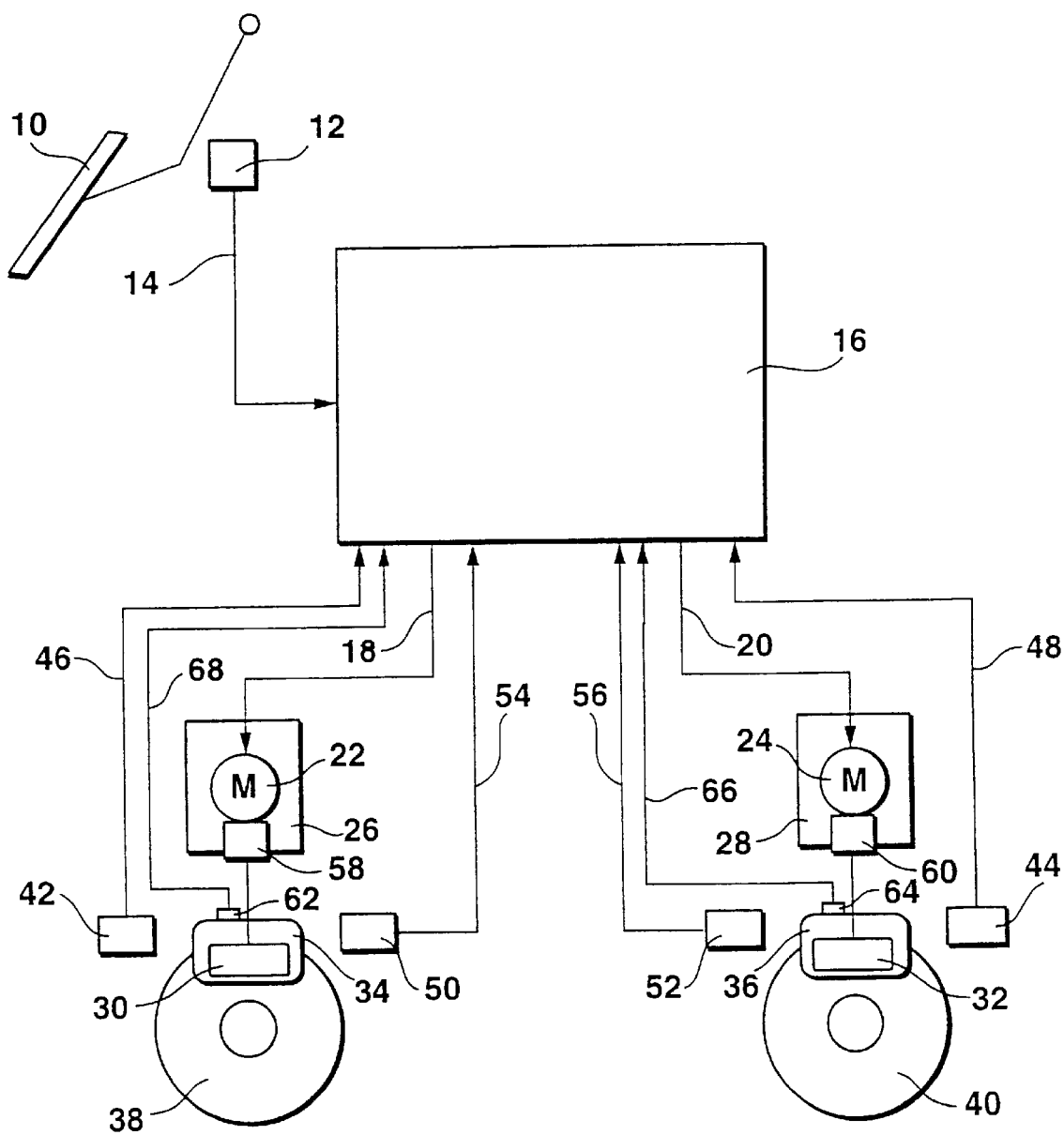
FIG. 1 shows a synoptic block diagram of a braking system according to the present invention for providing a brake application by way of an electric motor to an exemplary wheel pair.

FIG. 1 shows a synoptic block diagram of a braking system according to the present invention for providing a brake application by way of an electric motor for an exemplary wheel pair. This wheel pair could be associated with an axle or with a diagonal of the vehicle. The number 10 designates the brake pedal of the vehicle. The driver's braking input is sensed by sensor system 12 by measurement of angle, displacement, and/or force, and is conveyed via lines 14 to an electronic control system 16. In an advantageous design, this control system 16 is made up of control units distributed in decentralized fashion. Sensor system 12, as well as at least portions of electronic control system 16, are of redundant configuration. The electronic control system 16 actuates electric motors 22 and 24 via output lines 18 and 20, for example by way of a pulse-width modulated voltage signal using an H-bridge final stage or by way of electronically commutated SR (switched-reluctance) motors. The electric motors 22 and 24 are part of brake positioner 26 and 28. The rotational movements of these motors 22 and 24 are transformed, in the downstream gear-drive stages 58 and 60, into translational movements which result in displacements of brake linings 30 and 32. The brake linings 30 and 32 are guided in brake calipers 34 and 36, and act on brake disks 38 and 40 of wheels 1 and 2. Also provided, in a preferred exemplary embodiment, is an electrically actuable locking device with which the brake positioners 26 and 28 can be locked in their current position so that the electric motor 22, 24 can be switched to zero current, e.g. by immobilizing the rotor of the electric motor 22, 24. The position of the brake position is then held without energy expenditure.

At each wheel 1, 2, force or torque sensors 42 and 44 are used, the signals of which are conveyed via measurement lines 46 and 48 to electronic control system 16. In a variant embodiment, by way of these sensors 42 and 44 the axial bracing forces of the positioners 26 and 28 in a braking operation are measured, and thus constitute an indication of the normal forces acting on the brake disks 38 and 40. This variant will hereinafter be called "force measurement." The braking force is thus understood to be the force with which the brake pads press against the brake disk 38, 40 or drum. In another variant embodiment, the radial bracing forces of the brake linings 30, 32 are measured, and an indication is thus created of the frictional forces occurring in the brake disks 38, 40, or their frictional torques. Wheel velocities are additionally sensed via sensors 50 and 52, and transmitted via input lines 54 and 56 to control system 16. Also provided are angle sensors 62 and 64, the signals of which are conveyed via lines 66 and 68 to control system 16. In a preferred exemplary embodiment, these angle sensors 62 and 64 are Hall sensors which, for example, sense the rotation of the electric motor 22, 24 of the brake positioner 26, 28 and supply several pulses per revolution; the number of such pulses is an indication of the angle, and thus the distance, traveled by the brake linings 30, 32. In other exemplary embodiments other sensors, for example inductive sensors, potentiometers, etc., are used for measuring displacement or angle.

In electronic control system 16, setpoints for the individual wheel brakes or groups of wheel brakes are ascertained from the sensed braking input in accordance with preprogrammed characteristics diagrams. These setpoints correspond, for example, to the braking torques or braking forces to be set in a wheel or in a wheel pair, the magnitudes of which depend, inter alia, on the axle load distribution of the vehicle. From the setpoints ascertained, optionally for individual wheels, control differences are determined by comparison with the actual values for the braking forces or braking torques measured by sensors 42 and 44; these differences are conveyed to control algorithms, for example in the form of time-discrete PID controllers (proportional-plus-integral-plus-derivative controllers). The manipulated variable of these controllers is used to activate the electric motors 22 and 24, and corresponding activation signals are output via lines 18 and 20.

After braking is complete, the air gap at the wheel brakes is set. This can be accomplished in various ways. In the simplest exemplary embodiment, a predefined angle or position is set, via the corresponding measurement signal, in the context of an angle or position control system. This reference angle or reference position corresponds to a predefined air gap, i.e. to a predetermined spacing between the brake linings 30, 32 and the disk or drum 38, 40, the angle or position of the brake linings 30, 32 upon release of the brakes being taken into consideration. In another exemplary embodiment, release of the wheel brake is sensed and a predefined air gap is set by activating the positioning motor, for example, for a specific time or on the basis of the zero value or zero angle which is then present. In another exemplary embodiment the air gap is set by the torque or force controller by calculating (using a characteristic curve) an actual torque or actual force from the measured displacement signal or angle signal, taking into account the zero value of that signal upon release of the wheel brake. That characteristic curve corresponds to the correlation between braking torque or braking force and the angle or displacement of the brake lining. The calculated actual value is then used for torque or force control, a predefined air gap being set by way of the fictitious actual value. The procedure described below is independent of the concrete manner and fashion in which the air gap is set.

If no further braking input occurs during a specific time period after completion of the braking operation, an expanded air gap is set in the context of one of the aforementioned procedures, resulting in a greater spacing between brake lining 30, 32 and brake disk 38, 40. The expanded air gap is set only if the vehicle speed is above a specific limit speed. The expanded air gap is correspondingly set if a speed input that is automatically regulated, e.g. by a cruise control system, is present. In this case the expiration of the time period plays no role, so that the expanded air gap can be set sooner.

If a braking input occurs, by way of the driver or an active safety system (e.g. a vehicle dynamics system, an automatic slip control system, etc.), while a expanded air gap is set, the expanded air gap is traversed as quickly as possible by way of a modified activation strategy. In a preferred exemplary embodiment, an activation signal with a higher activation voltage or a greater pulse duty factor is output to the electric motor 22, 24; in one exemplary embodiment, no closed-loop control takes place, but rather the increased activation signal is output for a specific time which causes the existing distance to be traversed. Closed-loop control is then resumed.

Figure 2:
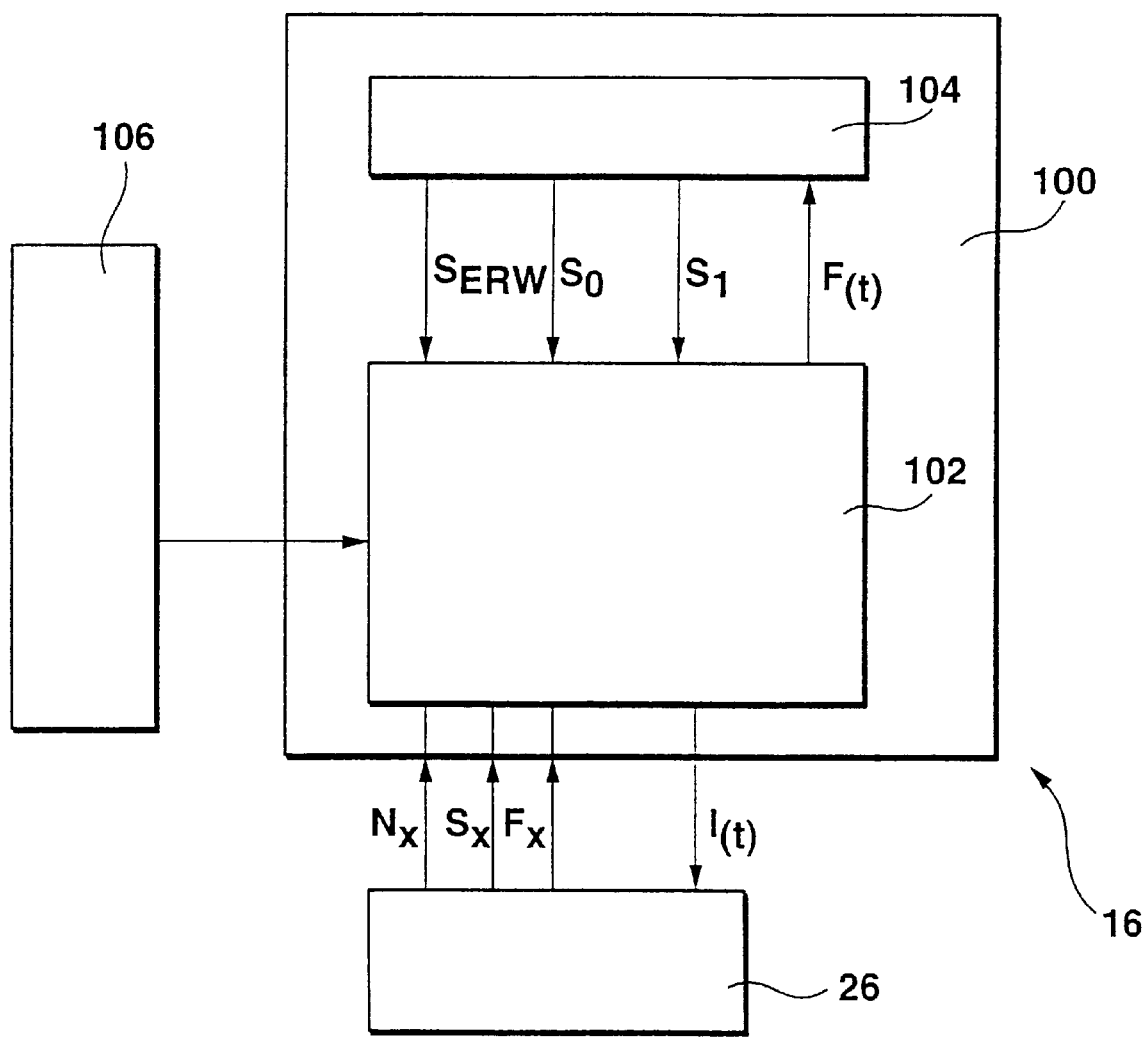
FIG. 2 depicts a preferred embodiment of a control device according to the present invention.

FIG. 2 depicts a preferred exemplary embodiment of control system 16 in conjunction with the air gap adjustment system. From brake positioner 26 and the corresponding wheel brake, the measured variables for braking force Fx (or braking torque), the displacement or angle variable Sx, and the wheel velocity Nx are transmitted to control system 16, and therein to a control unit 100, in order to control the wheel brake. From this control unit, brake positioner 26 receives an activation signal I(t) which represents the current through the electric motor. Control unit 100 comprises a controller 102 and an air gap adjustment module 104. In the preferred exemplary embodiment, the controller 102 represents a braking torque controller or a braking force controller. It receives from a braking input processor 106, which is also part of the control system 16, a setpoint for the braking torque or braking force. The controller 102 transmits to air gap adjustment module 104 the measured braking force F(t) or the measured braking torque, on the basis of which air gap adjustment module 104 derives the conditions for setting the air gap. Air gap adjustment module 104 transmits to controller 102 the air gap S0, the expanded air gap SERW, and the additional magnitude S1 which is added to the air gap to equal the expanded air gap. Based on this information, controller 102 sets the particular predefined air gap in the context of one of the aforementioned procedures. On the basis of the transmitted information, the controller 102 is capable of ascertaining whether or not an expanded air gap is set. As a function of that information, the expanded air gap is decreased in the manner described above in the event of a braking operation. In another exemplary embodiment, additionally or as an alternative to this information, the information for a rapid decrease of the expanded air gap is transmitted, authorizing the controller 102, for example, to switch over from closed-loop to open-loop control. In the preferred exemplary embodiment, air gap adjustment module 104 is substantially a timer function.

Figure 3:
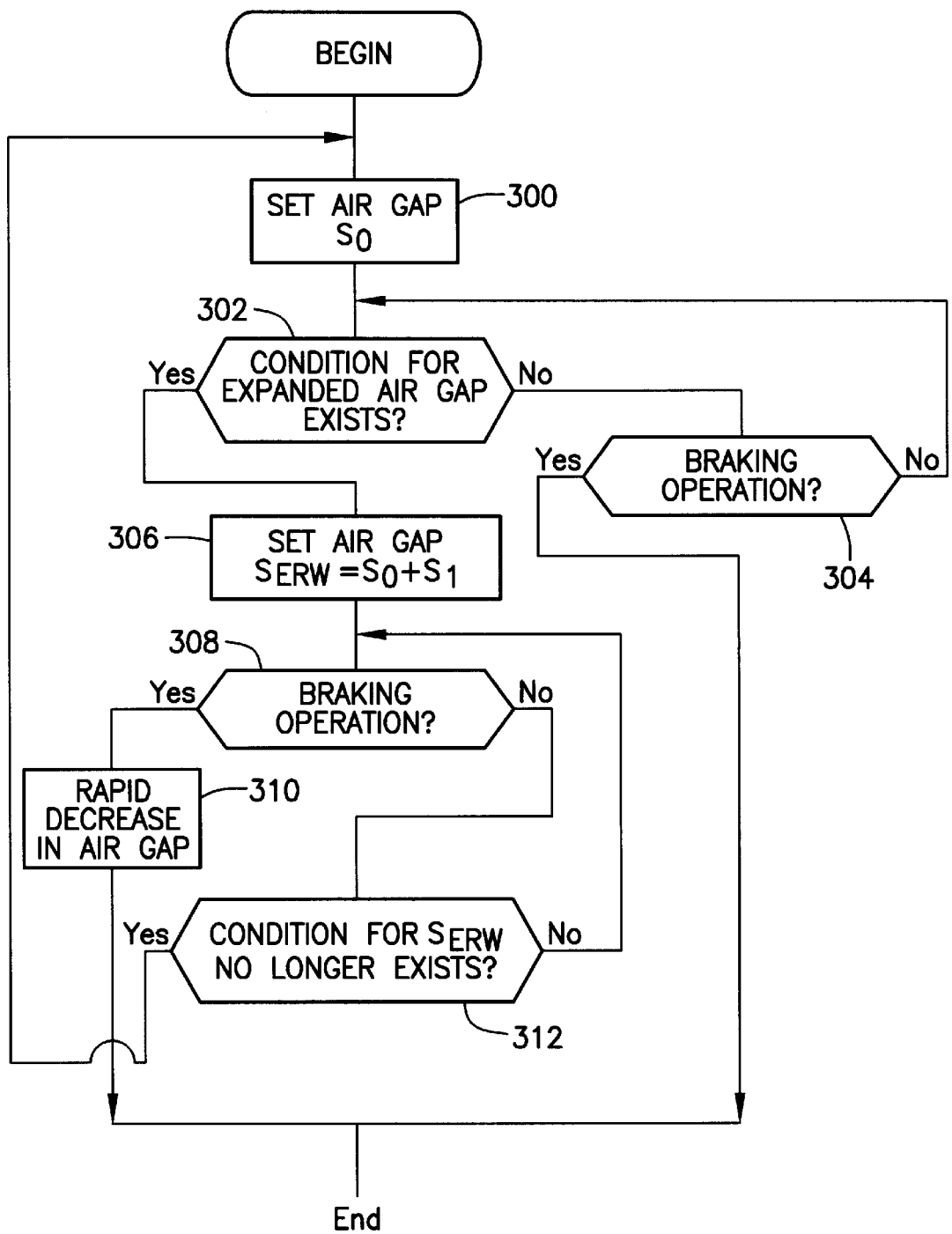
FIG. 3 shows a flow chart representation an implementation of a computer program relating to an air gap adjustment system according to the present invention.

In the preferred exemplary embodiment, the air gap adjustment system is implemented as a computer program. FIG. 3 is a sketch of a flow chart which shows an example of one such implementation.

The program described in FIG. 3 begins with the completion of a braking operation, i.e. with release of the brake linings 30, 32 from the brake disk 38, 40. This is determined, for example, on the basis of the measured braking force signal or braking torque signal. In the first step 300, the air gap S0 is defined and is set by the controller 102, for example, via a position control system. This air gap S0 is relatively small, i.e. the spacing between the brake lining 30, 32 and the brake disk or brake drum 38, 40 is so small that residual frictional torques cannot be ruled out in any operating situation. In the subsequent step 302, the conditions resulting in setting of an expanded air gap are checked. These conditions are the expiration of a predefined time period after completion of a braking operation, and the fact that the vehicle speed exceeds a limit speed and/or that an automatically activated speed input (e.g. of a cruise control system) has been activated. If none of these conditions is met, then in step 304 a check is made, for example on the basis of the setpoint signal or actual value signal, as to whether another braking action is present. If not, step 302 is repeated; otherwise the program is terminated. The air gap setting is locked in place by the electrically actuable locking device. If one of the conditions for the expanded air gap setting is met, i.e., the time has elapsed and the vehicle speed is above a limit speed or an automatic speed input is present, then in step 306 the air gap is set to a value SERW which is created as the sum of the air gap S0 and an additional magnitude S1. The spacing between the brake lining 30, 32 and the brake disk or drum 38, 40 is increased so that no residual frictional torques occur. Then in step 308 a check is made again, for example based on the setpoint signal, as to whether a braking operation is present. If so, a rapid decrease in the air gap is initiated in accordance with step 310, by outputting to the electric motor 22, 24 a high activation voltage or an increased pulse duty factor, preferably in the contxt of an open-loop control system with the closed-loop system deactivated. This function is performed principally by controller 102. The activation signal is greater than the activation signal in the case of service braking. The program is then terminated, and initiated again at the end of the next braking operation. If another braking operation is not present, a check is made in step 312 as to whether one of the conditions for setting the expanded air gap is no longer present. If all the conditions are still met, the program is performed with step 308; if one of the conditions no longer exists, the program is repeated with step 300 and the original air gap is set. This situation can occur, for example, if the vehicle speed falls below the limit speed or if an automatically regulated speed input is deactivated. In this case a braking operation may be expected subsequently, so that an improvement in dynamics can be achieved by setting the original air gap.

Figure 4A:
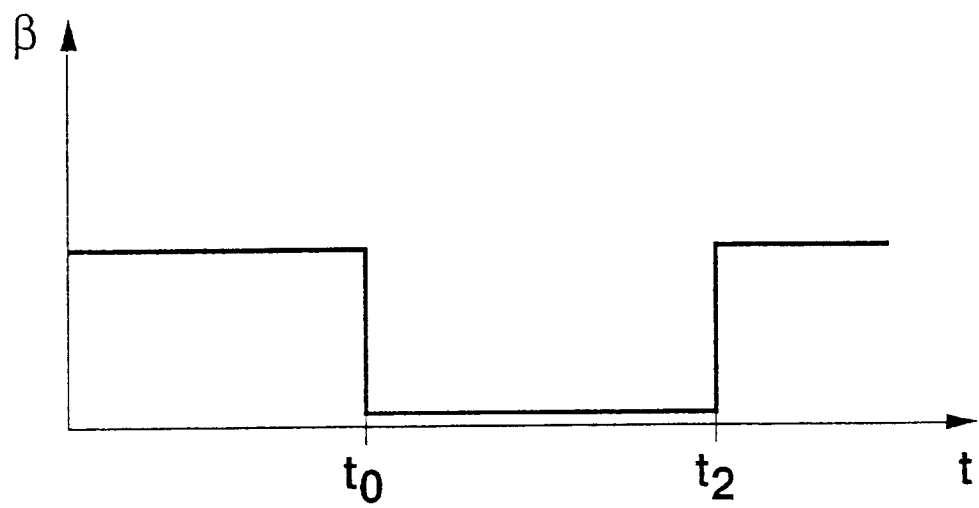
FIG. 4a depicts a first time diagram illustrating a functioning of an embodiment according to the present invention.
Figure 4B:
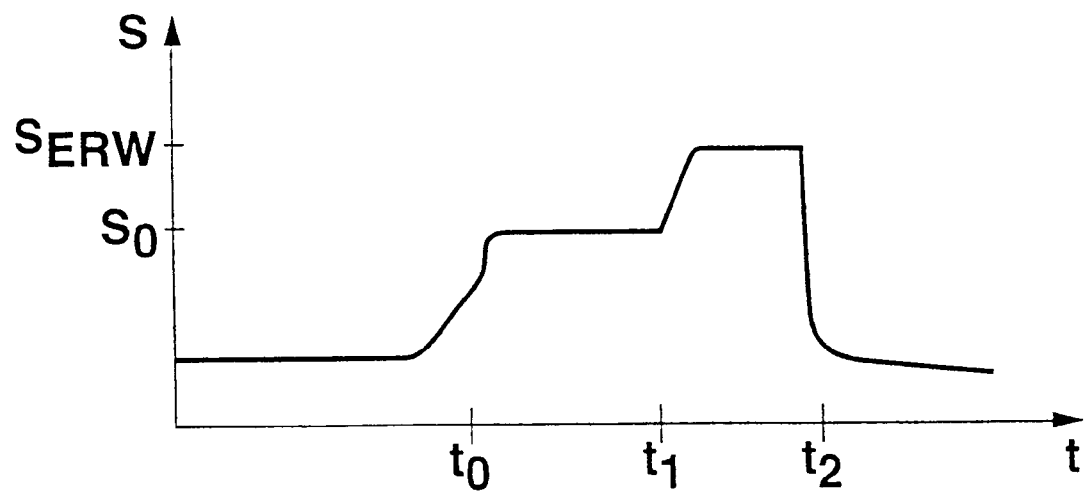
FIG. 4b depicts a second time diagram illustrating a functioning of an embodiment according to the present invention.

FIG. 4a and FIG. 4b depict in exemplary fashion, with reference to time diagrams, the effects of the procedure just described. FIG. 4a shows the braking input β over time, while in FIG. 4b the brake lining displacement S is plotted against time t. It is assumed that initially a braking operation is active. The brake lining is in contact with the brake disk or drum. At time $t_0$ the pedal 10 is released and the braking operation ends. This is detected, and the air gap S0 is therefore set. At time $t_1$ it is assumed that no additional braking operation has occurred, the predefined time period has elapsed, and the speed is above the limit speed, so that at time $t_1$ the expanded air gap SERW is set. At time $t_2$ the driver actuates the brake pedal 10, initiating another braking operation. This results in a rapid decrease in the expanded air gap as shown in FIG. 4b, and in application of the brake linings 30, 32 against the disk or drum 38, 40. Closed-loop regulation of the braking operation occurs thereafter.

The procedure just described is applicable not only in conjunction with electric-motor braking systems, but wherever active adjustment of the air gap is possible.

What is claimed is:

1. A method for controlling a braking system of a vehicle and having an electrically actuable control device arranged with respect to a wheel brake of the braking system, comprising the step of:
   after a completion of a braking operation, activating the electrically actuable control device in order to set a predetermined air gap between a brake lining and one of a brake disk and a brake drum, wherein the air gap depends on an operating state of the vehicle.

2. The method according to claim 1, wherein the electrically actuable control device is an electric motor.

3. The method according to claim 1, further comprising the step of:
   while the vehicle is in an unbraked operation, increasing the air gap after an expiration of a time threshold following the completion of the braking operation.

4. The method according to claim 1, further comprising the step of:
   increasing the air gap if a speed of the vehicle exceeds a predefined limit speed.

5. The method according to claim 1, further comprising the step of:
   increasing the air gap if an automatic speed request is present while the vehicle is in an unbraked operation.

6. The method according to claim 1, further comprising the step of:
   if the air gap is set to an expanded magnitude and if a braking input is present, decreasing the air gap using an activation strategy different from that of a closed-loop braking control system.

7. The method according to claim 6, wherein:
   the electrically actuable control device is an electric motor, and
   the electric motor is activated with one of a higher activation voltage and a greater pulse duty factor.

8. The method according to claim 6, further comprising the step of:
   implementing an open-loop braking control system instead of implementing the closed-loop braking control system.

9. The method according to claim 1, further comprising the step of:
   if the air gap is set to an increased magnitude, setting the air gap to an original magnitude again if a condition resulting in a setting of the air gap to the increased magnitude is no longer met.

10. A method for controlling a braking system of a vehicle comprising the steps of:
    after a completion of a first braking operation, activating an electrically actuable control device in the braking system of the vehicle in order to set a predetermined air gap between a brake lining and one of a brake disk and a brake drum in a wheel brake as a function of an operating state of the vehicle;
    at a beginning of a second braking operation, activating the electrically actuable control device to traverse the predetermined air gap in the wheel brake by transmitting an activation signal to a positioning device in the electrically actuable control device, the activation signal having a magnitude greater than a magnitude of a routine activation signal for a routine braking operation; and
    during the second braking operation, performing a closed-loop control of one of a braking force and a braking torque for each wheel brake.

11. An apparatus for controlling a braking system of a vehicle and having an electrically actuable control device arranged on each wheel brake of the braking system, comprising:
    a control system for setting a predetermined air gap between a brake lining and one of a brake disk and a brake drum after a completion of a braking operation, the control system including an arrangement for setting the air gap as a function of an operating state of the vehicle.

12. An apparatus for controlling a braking system of a vehicle comprising:
    a braking system having electrically actuable control devices, each device arranged to act on a respective wheel brake of the braking system; and
    an air gap control system connected to the devices, the air gap control system being configured to:

activate each device to set a predetermined air gap between a brake lining and one of a brake disk and a brake drum in a wheel brake, the predetermined air gap being selected by the air gap control system as a function of the operating state of the vehicle after the vehicle completes a first braking operation, at the start of a second braking operation by the vehicle, activate each device to traverse the selected predetermined air gap in the wheel brake when a positioning device in the device receives an activation signal from the air gap control system of a magnitude greater than a magnitude of an activation signal for a routine braking operation, and implement a closed-loop control of one of a braking force and a braking torque during the second braking operation for each wheel brake.

* * * * *